United States Patent [19]

Stojanovski

[11] Patent Number: 5,064,316

[45] Date of Patent: Nov. 12, 1991

[54] BALL NOSE MILLING TOOL

[76] Inventor: Stojan Stojanovski, 1950 Birchwood, Troy, Mich. 48084

[21] Appl. No.: 650,777

[22] Filed: Feb. 5, 1991

Related U.S. Application Data

[63] Continuation-in-part of Ser. No. 588,453, Sep. 26, 1990.

[51] Int. Cl.⁵ .......................... B23P 15/34; B23C 5/22
[52] U.S. Cl. ........................................ 407/40; 407/46; 407/48; 407/113
[58] Field of Search ................. 407/34, 40, 46, 48, 407/54, 113, 90; 408/188

[56] References Cited

U.S. PATENT DOCUMENTS

| | | | |
|---|---|---|---|
| 3,027,786 | 4/1962 | Severson | 407/40 X |
| 3,354,526 | 11/1967 | Erkfritz | 407/40 |
| 4,060,335 | 11/1977 | Holloway et al. | 407/54 X |
| 4,423,989 | 1/1984 | Kress | 408/197 |
| 4,566,828 | 1/1986 | Reinauer | 407/48 |

Primary Examiner—Steven C. Bishop
Attorney, Agent, or Firm—Charles W. Chandler

[57] ABSTRACT

A milling tool in which a circular cutter plate is located in a transverse slot formed in a rotary spindle. The circular plate has four chord-oriented shoulders inset into its side faces. A plate holder mechanism has a V-shaped edge configuration mated to two of the chord-oriented shoulders, such that the cutter plate is accurately and firmly located within the slotted portion of the spindle. The plate holder mechanism includes an axially extending post that fits into an axial hole in the spindle for accurately orienting the plate holder mechanism to the spindle.

3 Claims, 1 Drawing Sheet

BALL NOSE MILLING TOOL

CROSS-REFERENCE TO RELATED APPLICATION

This is a continuation-in-part of my copending patent application Ser. No. 588,453 filed on Sept. 26, 1990.

BACKGROUND OF THE INVENTION

This invention relates to a milling tool designed to form a semi-circular cross-sectioned groove in a work piece. The groove may be used as a ball track in a ball screw element. Other uses are possible. Tools for a similar purpose are shown in U.S. Pat. No. 4,423,989 issued to Kress, et al., and U.S. Pat. No. 4,566,828 issued to J. Reinauer.

The milling tool of the present invention comprises a rotary spindle (shaft) having an axially-extending slot in its end surface. A circular cutter plate fits into the slot so that at least one half of its circular cutting edge projects beyond the spindle. The peripheral edge of the cutter plate is subdivided into four segmental arcuate cutting edges, with alternate cutting edges facing in opposite directions.

During powered rotation of the spindle around its axis, two of the segmental arcuate cutting edges are exposed to the work surface. The other two cutting edges are located within the spindle slot for later use (when the two exposed edges become dulled or worn). Each exposed segmental cutting edge performs a cutting function on one half of the engaged work piece surface.

A principal feature of the invention is a cutter plate holder means that effectively utilizes shoulder surfaces on the cutter plate for precisely retaining the cutter plate in a centered position. The term "centered position" refers to a position in which the separation point (line) between the two exposed segmental cutting edges is located precisely on the axial midplane of the spindle (shaft). With this centered arrangement, each segmental cutting edge achieves the same cutting action in a balanced condition. The cutter plate holder means includes a post construction that accurately orients the cutter plate holder means to the rotary spindle. The post construction constitutes a relatively low cost mechanism for properly orienting the cutter plate holder means.

IN THE DRAWINGS

DESCRIPTION OF THE PREFERRED EMBODIMENT

Figure 1:
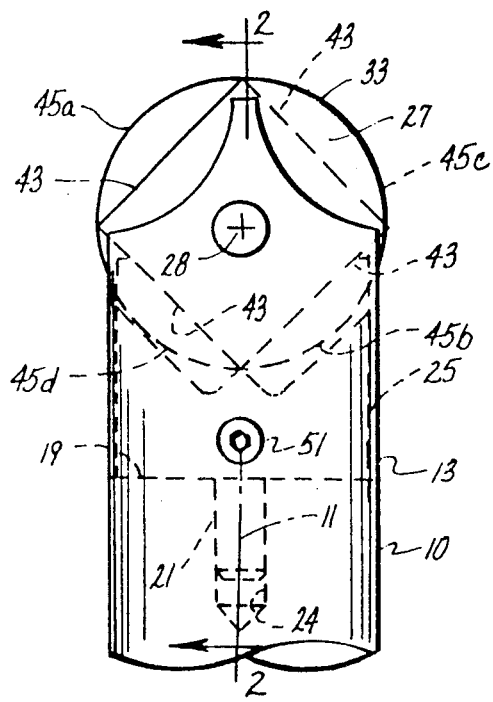
FIG. 1 is a front elevational view of a cutting tool embodying the invention.
Figure 2:
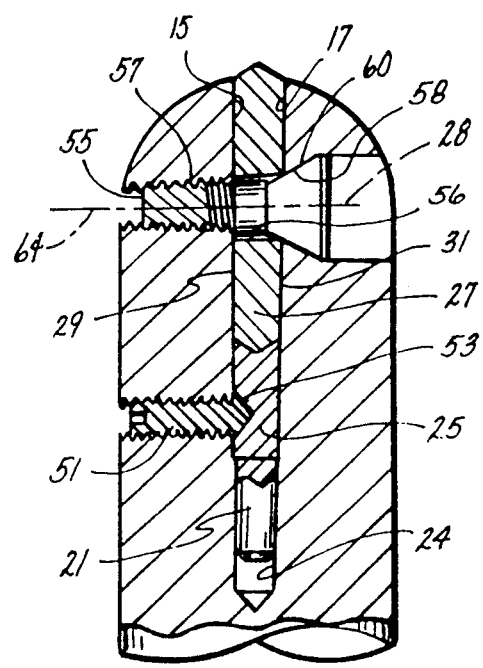
FIG. 2 is a sectional view taken on line 2—2 in FIG. 1.
Figure 3:
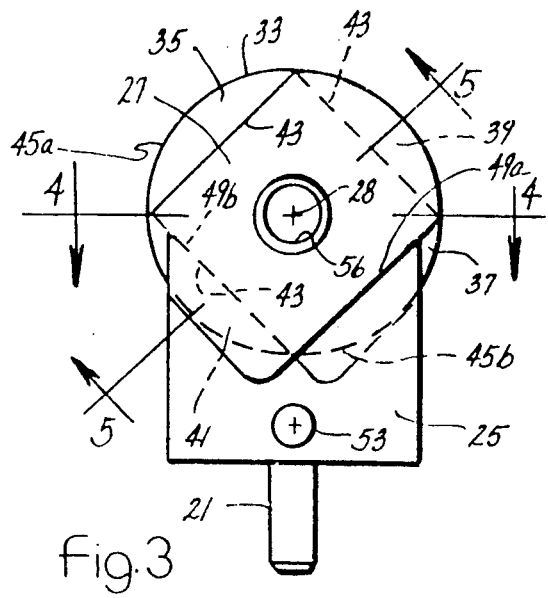
FIG. 3 is a front elevational view of a cutter plate and holder means usable in the FIG. 1 cutting tool.
Figure 5:
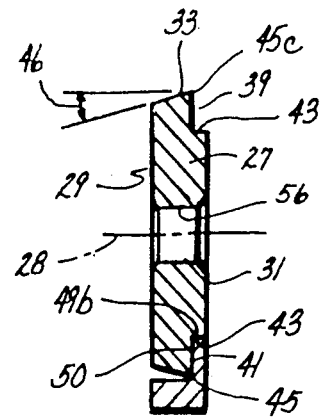
FIG. 5 is a sectional view on line 5—5 in FIG. 3.

FIGS. 1 and 2 show a milling tool that comprises a spindle (shaft) 10 adapted for rotation around longitudinal axis 11. A straight through slot 13 extends through the shaft in a plane coincident with the spindle diameter. The slot forms two opposed flat side faces 15 and 17, and an interconnecting flat bottom face 19. The slot bottom face acts as a seating surface for a cutter plate holder 25. The construction of holder 25 is best seen in FIGS. 3 and 5.

A circular cutter insert or cutter plate 27 is removably positioned within slot 13, with opposite side faces 29 and 31 of the plate lying against slot side faces 15 and 17. Plate 27 has a circular peripheral edge 33 that is partially exposed and partially located within slot 13. The portion of plate edge 33 within slot 13 is engaged with surfaces of plate holder 25, such that cutter plate 27 is firmly held in a fixed position relative to spindle 10. The spindle and cutter plate 27 rotate as a unit around spindle axis 11 to perform a cutting operation.

The construction of cutter plate 27 is best seen in FIGS. 3 through 6. The cutter plate has two segmental recesses 35 and 37 formed in side face 29. Two additional segmental recesses 39 and 41 are formed in side face 31. These four recesses alternate so that successive recesses are formed in opposite faces of the plate. The various segmental recesses form four chord-oriented shoulders 43 inset into each face of the plate. These shoulders are adapted to engage edge surfaces on holder 25 to prevent undesired rotation of cutter plate 27 around its transverse central axis 28.

The segmental recesses define four arcuate cutter edges 45a, 45b, 45c and 45d extending along the peripheral edge of plate 27 Arcuate cutter edges 45a and 45b face in one direction, while arcuate cutter edges 45c and 45d face in the opposite direction.

When the cutter insert is mounted within spindle 10, as shown in FIG. 1, cutter edges 45a and 45c are exposed for machining (cutting) purposes; the other two cutter edges 45b and 45d are disposed within the spindle and hence inactive. The cutter insert can be reoriented so that cutter edges 45b and 45d are active cutter edges. With the arrangement of FIG. 1, rotation of spindle 10 around axis 11 initially causes arcuate cutter edge 45a to move out of the plane of the paper to perform a cutting operation; simultaneously arcuate edge 45c moves into the plane of the paper. After one-half revolution of the spindle, the arcuate cutter edges will reverse their positions, i.e. cutter edge 45a will be in the position of cutter edge 45c, and cutter edge 45c will be in the position of cutter edge 45a. Spindle 10 is rotated continuously in one direction to perform a milling operation.

Figure 6:
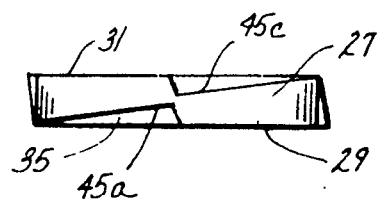
FIG. 6 is a top edge view of the FIG. 3 structure.

Each segmental recess 35, 37, 39 or 41 has a variable depth (normal to the plane of plate 27), whereby the four segmental cutter edges 45a, 45b, 45c and 45d extend at a slight angle to the general plane of cutter plate 27 (as seen best in FIG. 6). The angulation of the cutter edges is helpful during the cutting process in that it enables the cutting load to be gradually applied to (along) the cutter edge surface. Each cutter edge shears into the work rather than striking it abruptly.

Figure 4:
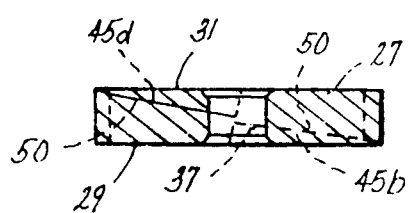
FIG. 4 is a sectional view on line 4—4 in FIG. 3.

As seen in FIG. 5, the peripheral edge of the cutter plate is angled (set back) as at 46, to enable the associated cutting edge 45c to have line contact with the work surface, thereby enabling the cutting process to proceed without undue radial loading on the cutter plate. The other peripheral edges associated with cutter edges 45a, 45b, and 45d are similarly set back. As seen in FIGS. 4 and 6, the four cutting edges 45a, 45b, 45c and 45d are continuous, without any circumferential break where the cutting edges meet. Each segmental cutting edge has essentially the same loading. Also, the entire surface of the work is cut during a given pass (rotation) of the tool. There is no uncut area along rotational axis 11.

Proper operation of cutter plate 27 requires that the plate be rigidly held in spindle 10, with the demarcation line between the two exposed (active) cutter edges exactly on rotational axis 11. FIGS. 3 and 5 show a plate-like holder 25 designed to rigidly mount cutter plate 27 in spindle slot. The holder mechanism includes an upstanding plate having two convergent end edges 49a and 49b defining a V-shaped edge configuration mated to the chord-oriented shoulders 43 on cutter plate 27.

Edges 49a and 49b are in different planes so as to mate with their respective shoulders 43.

As viewed in FIG. 3, edge 49a is in a plane spaced in front of the plane of edge 49b. An edge portion of cutter plate 27 is located behind edge 49a; another edge portion of cutter plate 27 is located in front of edge 49b. Portions of the holder plate are cut-away to form angular flat faces 50 (FIG. 5) designed to lie against the segmental flat faces defined by segmental recesses 35, 37, 39 and 41 in cutter plate 27.

Cutter plate 27 can be inserted into holder 25 so that two of the four shoulders 43 abut against edges 49a and 49b, with segmental face areas of plate 27 lying against flat faces 50 of the holder in a sandwich-like configuration. Both the holder and the cutter plate can then be inserted into slot 13 of the spindle.

Holder 25 includes a downwardly extending cylindrical post 21. Spindle 10 has a mating cylindrical hole or socket 24. When holder 25 is correctly inserted into slot 13, post 21 telescopes into hole 24. The lower face of the holder seats against bottom face 19 of the slot.

Holder 25 is retained in slot 13 by means of a set screw 51 that is threaded into the wall of spindle 10 so that its conical tip (end) extends into a conical recess 53 in a side face of the holder. The axis of recess 53 is located slightly further away from the slot bottom face 19 than the axis of screw 51. Therefore, as the conical tip of the screw engages the cone surface of the recess, the plate-like holder 25 is cammed tightly against face 19. This gives the holder a fixed location, and prevents vibrational forces from causing the holder to become loose in slot 13. Post 21 prevents the holder from shifting laterally along the slot.

When cutter plate 27 is located within holder 25 (in slot 13), a cap screw 55 (FIG. 2) is threaded through bore 56 in cutter plate 27 into a threaded opening 57 in spindle 10, to thereby position the cutter plate firmly against holder 25. The head of screw 55 extends within an oversize bore in spindle 10, with frusto-conical surface 60 of the head being engaged with a frusto-conical surface 58 formed at the mouth of bore 56. Holder edges 49a and 49b abut against cutter plate shoulders 43 to cooperate with screw 55 for preventing the circular cutter plate from rotating around its axis 28. The engagement between surfaces 49 and 43 accurately locates the cutter so that its exposed arcuate segmental cutter edges 45 are precisely positioned relative to spindle axis 11.

Referring to FIG. 2, bore 56 of the cutter plate has a frusto-conical edge 58 which opens to side face 31 of the cutter plate.

When the cutter plate is mounted in the slot, the central axis 28 of cutter plate bore 56 is offset slightly above axis 64 of threaded opening 57. As a consequence, as the cap screw is tightened, the frusto-conical surface 60 of the cap screw cams the cutter plate downwardly toward bottom surface 19 of the slot, thereby urging the cutter plate holder to firmly lock the cutter plate in position. The diameter of bore 56 is slightly larger than the outside diameter of the cap screw shank to permit the camming motion. Screws 51 and 55 act cooperatively; screw 51 cams holder 25 firmly down against seat 19, while screw 55 cams cutter plate 27 firmly down against holder 25.

Cutter plate 27 is reversible, such that the plate can be adjusted (rotated) so that one pair of shoulders 43 occupy the positions of the other pair of shoulders 43. The cutter plate is rotated one hundred eighty degrees to accomplish this adjustment. The adjustment is for the purpose of presenting new (unworn) cutter edges to the work surface.

The cutter plate can be formed with transverse grooves in its peripheral edge for the purpose of breaking apart chips formed during operation of the tool, as shown for example in FIG. 13 of aforementioned patent application, Ser. No. 588,453. As the cutter-spindle assembly rotates around axis 11, transverse grooves in cutter edges 45a and 45c (or in edges 45b and 45d) temporarily interrupt the chip-forming process so that relatively small chips are formed. The finish of the work surface is not affected by this action.

A principal feature of this invention is post structure 21 for accurately locating holder 25 relative to the rotational axis of spindle 10. Socket 24 can be located precisely on the spindle rotational axis because it can be formed during the same machining operational set-up used to form the spindle side surface. Post structure 21 can be machined to its final diameter in a fixture that uses edges 49a and 49b as locator surfaces. The fixture has a surface configuration similar to that of cutter plate 27. The illustrated arrangement enables socket 24 to be precisely oriented on the spindle rotational axis, and convergent edges 49a and 49b to be precisely oriented relative to socket 24 (because post 21 can be accurately located relative to edges 49a and 49b).

Above-mentioned patent application Ser. No. 588,453 shows an overall spindle-cutter arrangement similar to the general arrangement shown herein. However, an upstanding transverse rib is used as a centering device instead of the herein illustrated cylindrical post. Such a rib can be precisely oriented relative to the spindle rotational axis, but a time-consuming machining operation is required. The lateral side edge surfaces of the rib have to be shaved separately, using a reciprocable (reciprocal) press-type shaving cutter. Each side edge has to be spaced the same distance from the spindle rotational axis. With the cylindrical post construction shown herein, the centering action is achieved quickly and economically in a one-step operation.

U.S. Pat. No. 4,423,989 to Kress et al shows a machine tool wherein a cylindrical post is used to mount an arm structure designed to prevent undesired rotation of a circular cutter element. The arm structure includes a small protuberance intended to fit into selected grooves in the edge of the cutter element. The use of such a small protuberance is believed to be disadvantageous in that a relatively small protuberance area has to carry the load forces; the protuberance is subject to early deformation or wear.

The construction herein proposed includes a cutter plate holder means having a centering post 21 and two divergent cutter support edges 49a and 49b that provide extensive area support for the cutter plate. Two screws 51 and 55 are provided for drawing the holder and cutter plate downwardly into slot 13, such that the cutter plate is rigidly locked to spindle 10.

The clamping action of screws 51 and 55 is believed to be an advance over the clamping mechanism used in U.S. Pat. No. 4,423,989, which involves a clamp screw having a shank extending through a circular hole in the cutter plate. Clearances necessary to pass the shank through the circular holes in the cutter element and spindle will inevitably lead to a loosened cutter element condition.

What is claimed is:

1. A milling tool comprising:

a rotary spindle having an axial slot extending within a plane coincident with the spindle diameter, said slot defining two opposed flat side faces and an interconnecting bottom face;

a circular cutter plate having a peripheral cutting edge, and first and second side faces; said cutter plate being adapted for removable disposition within said axial slot so that the side faces of the cutter plate lie against the side faces of the slot;

first and second diametrically-spaced segmental recesses in said first cutter plate side face forming first and second chord-oriented shoulders inset from said first cutter plate side face;

third and fourth diametrically-spaced segmental recesses in said second cutter plate side face forming third and fourth chord-oriented shoulders inset from said second cutter plate side face;

and a cutter plate holder means that includes a holder plate disposed in said slot between the slot bottom face and the cutter plate peripheral edge; said holder plate having two spaced flat convergent end edges in parallel planes defining a V-shaped edge structure matable to one of the chord-oriented shoulders on the first cutter plate side face and to one of the chord-oriented shoulders on the second cutter plate side face;

said spindle having a cylindrical hole extending from the slot bottom face on the spindle axis; said holder plate having a cylindrical post extending therefrom into the cylindrical hole to orient the cutter plate holder means to the spindle.

2. The milling tool of claim 1, wherein said circular cutter plate is adjustable around the cutter plate axis, whereby said V-shaped edge structure is selectively engaged with said first and third shoulders or said second and fourth shoulders.

3. The milling tool of claim 1, and further comprising means for retaining said cutter plate in a fixed position within said slot, said retaining means comprising a threaded opening extending through the spindle right angularly from one of the slot side faces, an oversize bore extending through the spindle right angularly from the other slot side face; said oversize bore having a frusto-conical surface at its connection point with said other slot side face; said cutter plate having a central hole with a frusto-conical mouth opening 58, said cutter plate being positionable in the slot so that said mouth opening is adjacent said other slot side face; a threaded fastener extending through the central hole of the cutter plate and not said threaded opening, said fastener having a frusto-conical head located in the oversize bore, with portions of its frusto-conical side surface engaged against the oversize bore and the frusto-conical mouth opening; said frusto-conical mouth opening having its axis slightly offset from the axis of the threaded opening in a direction whereby during a threading motion of the fastener into the threaded opening, the frusto-conical head of the fastener exerts a cam force on the frusto-conical mouth opening, to thereby shift the cutter plate into tight engagement with the cutter plate holder.

* * * * *